US009328029B2

(12) United States Patent
Hill

(10) Patent No.: US 9,328,029 B2
(45) Date of Patent: May 3, 2016

(54) METHODS OF PREPARING NOVEL ENHANCED HIGH Q MATERIAL COMPOSITIONS

(71) Applicant: SKYWORKS SOLUTIONS, INC., Woburn, MA (US)

(72) Inventor: Michael David Hill, Frederick, MD (US)

(73) Assignee: Skyworks Solutions, Inc., Woburn, MA (US)

(*) Notice: Subject to any disclaimer, the term of this patent is extended or adjusted under 35 U.S.C. 154(b) by 0 days.

(21) Appl. No.: 14/482,908

(22) Filed: Sep. 10, 2014

(65) Prior Publication Data
US 2015/0065332 A1 Mar. 5, 2015

Related U.S. Application Data

(62) Division of application No. 13/323,477, filed on Dec. 12, 2011, now Pat. No. 8,835,339.

(60) Provisional application No. 61/433,635, filed on Jan. 18, 2011, provisional application No. 61/422,623, filed on Dec. 13, 2010.

(51) Int. Cl.
*C04B 35/00* (2006.01)
*C04B 41/80* (2006.01)
(Continued)

(52) U.S. Cl.
CPC ............. *C04B 41/80* (2013.01); *C04B 35/4686* (2013.01); *C04B 35/478* (2013.01); *C04B 2235/3201* (2013.01); *C04B 2235/3206* (2013.01); *C04B 2235/3208* (2013.01); *C04B 2235/3213* (2013.01);
(Continued)

(58) Field of Classification Search
CPC .............................. C04B 35/462; H01L 28/55
USPC ................... 257/295, 272; 501/135, 136, 137
See application file for complete search history.

(56) References Cited

U.S. PATENT DOCUMENTS 5,750,452 A 5/1998 Park et al.
6,034,015 A 3/2000 Lin et al.
(Continued)

FOREIGN PATENT DOCUMENTS

JP 2002-145660 A 5/2002

OTHER PUBLICATIONS

Mizuta et al. Formation of Tungsten Bronze-Type (Ba6−3xSm8+2x)aTi18−yAlyO54 (a=1+y/36) Solid Solutions and Microwave Dielectric Properties. Jpn J Appl Phys. vol. 35 (1996) pp. 5065-5068.*

(Continued)

*Primary Examiner* — Noah Wiese
(74) *Attorney, Agent, or Firm* — Knobbe Martens Olson and Bear LLP

(57) ABSTRACT

A framework for developing high quality factor (Q) material for electronic applications in the radio frequency range is provided. In one implementation, ceramic materials having a tungsten bronze crystal structure is modified by substituting one or more elements at one or more lattice sites on the crystal structure. The substitute elements are selected based on the ionic radius and other factors. In other implementations, the modified ceramic material is prepared in combination with compositions such as rutile or a perovskite to form a orthorhombic hybrid of perosvkite and tetragonal tungsten bronze.

19 Claims, 11 Drawing Sheets

(51) Int. Cl.
*C04B 35/468* (2006.01)
*C04B 35/478* (2006.01)

(52) U.S. Cl.
CPC .......... *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3234* (2013.01); *C04B 2235/3236* (2013.01); *C04B 2235/3241* (2013.01); *C04B 2235/3244* (2013.01); *C04B 2235/3267* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3286* (2013.01); *C04B 2235/3287* (2013.01); *C04B 2235/3293* (2013.01); *C04B 2235/768* (2013.01)

(56) References Cited

U.S. PATENT DOCUMENTS 6,503,861 B1    1/2003   Murakawa et al.

2013/0127568 A1    5/2013   Hirahara et al.

OTHER PUBLICATIONS

Ohsato et al. Formation of Solid Solutions of New Tunsten Bronze-Type Microwave Dielectric Compounds Ba6-3xR8+2xTi18O54 (R=Nd and Sm, $0 \leq x \geq 1$). Jpn J Appl Phys. vol. 32 (1993) pp. 4323-4326.*

International Search Report dated Jun. 27, 2012 of PCT/US2011/064463—10 pages.

Kaur, Dalveer et al., "Processing, dielectric behavior and conductivity of some complex tungsten-bronze dielectric ceramics.", Journal of Ceramic Processing Research, 2006, vol. 7, No. 1, pp. 31-36.

Ohsato et al. Microwave Dielectric Properties and Sintering of Ba6-3xR8+2xTi18O54 (R=Sm, x=2/3) Solid Solution with Added Rutile. Jpn. J. Appl. Phys. vol. 37 (1998) pp. 5357-5359.

Zhang et al. Upper limit of x in Ba6-3xNd8+2xTi8O54 new tungsten bronze solid solution. Journal of the European Ceramic Society 27 (2007) 3011-3016.

Mirsaneh et al. Circularly Polarized Dielectric-Loaded Antennas; Current Technology and Future Challenges. Adv. Funct. Mater. 2008, 19, 2293-2300.

* cited by examiner

METHODS OF PREPARING NOVEL ENHANCED HIGH Q MATERIAL COMPOSITIONS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

1. Field of the Invention

Embodiments of the present invention relate to material compositions and methods of fabrication useful in electronic applications, and in particular, useful in radio frequency (RF) electronics.

2. Description of the Related Art

The quality factor (Q) is an important dimensionless factor for dielectric materials used in RF electronics such as cellular phones, biomedical devices, and RFID sensors. Currently commercially available materials have a Q in the 6000 range at 1 GHz. There is a continuing need for higher Q materials, and in particular, a need for higher Q ceramic dielectric materials with dielectric constants in the 70 to 80 range for applications such as miniaturized cavity resonators in the 500 MHz and 1 GHz range. There are currently a limited number of high Q ceramic materials that can be used in the higher frequency range. The Q of a ceramic material can be changed through a number of different ways, including changing the chemical formula of the underlying crystal structures that make up the material. However, substituting different elements into the underlying crystal structure can produce or relieve strain, thus changing the physical characteristics of the material. Some of the physical characteristic changes may not be predictable or desired. As such, there is a general need for expanding the number of high Q ceramic materials for use in RF electronics applications.

SUMMARY OF THE INVENTION

The compositions, materials, methods of preparation, devices, and systems of this disclosure each have several aspects, no single one of which is solely responsible for its desirable attributes.

Any terms not directly defined herein shall be understood to have all of the meanings commonly associated with them as understood within the art. Certain terms are discussed below, or elsewhere in the specification, to provide additional guidance to the practitioner in describing the compositions, methods, systems, and the like of various embodiments, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments herein.

Preferred embodiments of the present invention are directed to enhanced Q materials and related methods thereof.

In one embodiment, the invention provides a composition and material comprising a barium neodymium titanate system, such as:

$$Ba_{6-3x}Nd_{8+2x}Ti_{18}O_{54},$$

whereby $x<2/3$. Ba ions greater than 4 formula units are substituted for $Sr^{2+}$, $Ca^{2+}$, or a combination of $Na^+$ and $Nd^{3+}$ to change physical characteristics in the material. The Q is maximal at $x=2/3$ and drops off rapidly for $x<2/3$ or $x>2/3$. Preferably, the material has an orthorhombic tungsten bronze crystal structure. One or more aspects of the present invention can be directed to improved Q material having a formula:

$$Ba_4M^{II}_{2-3x}Ln_{8+3x}Ti_{18-3x}M^{III}_{3x}O_{54},$$

whereby $x \leq 2/3$ and the material has an orthorhombic tungsten bronze crystal structure. In one implementation, $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium.

One or more aspects of the present invention can pertain to improved Q material having a formula:

$$Ba_4(M^I_{0.5}Ln_{0.5})_{2-3x}Ln_{8+3x}Ti_{18-3x}M^{III}_{3x}O_{54},$$

whereby $x \leq 2/3$ and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium.

One or more aspects of the present invention can pertain to improved Q material having a formula:

$$Ba_4M^{II}_{2-3x}Ln_{8+2x+y}Ti_{18-3x}M^{III}_{3y}O_{54},$$

whereby $0<x<2/3$ and $0<y<2/3$ and the material has an orthorhombic tungsten bronze crystal structure. $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium.

One or more aspects of the present invention can pertain to improved Q material having a formula:

$$Ba_4(M^I_{0.5+a}Ln_{5-a})_{2-3x}Ln_{8+2x+y}Ti_{18-3y+a}M^{III}_{3y-a}O_{54},$$

whereby $0<x<2/3$, $0<y<2/3$, and $-0.5<a<0.5$ and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium.

One or more aspects of the present invention can also pertain to methods of fabricating improved Q component. One or more methods comprise blending a precursor mixture of compounds comprising a barium source, a titanium source, at least one lanthanide series element, and at least one metal source, calcining the material at the appropriate temperature, milling the material to the appropriate size, forming the ceramic using methods known in the art, and sintering the improved Q ceramic to produce improved Q component. The component is comprised of improved Q ceramic material having a formula:

$$Ba_4M^{II}_{2-3x}Ln_{8+3x}Ti_{18-3x}M^{III}_{3x}O_{54},$$

whereby x≤⅔ and the material has an orthorhombic tungsten bronze crystal structure. In one implementation, $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some embodiments of the invention, the above composition is prepared in combination with $TiO_2$ (rutile) or a perovskite with the general formula $Nd_{1-1/3x}Ti_xO_3$ and $M^{III}$ is aluminum or gallium, or improved Q ceramic material having a formula, $$Ba_4(M^I_{0.5}Ln_{0.5})_{2-3x}Ln_{8+3x}Ti_{18-3x}M^{III}_{3x}O_{54},$$

whereby x≤⅔ and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium. In some other particular embodiments, the above composition is prepared in combination with $TiO_2$ (rutile) or a perovskite with the general formula $Nd_{1-1/3x}M^{III}_{1-x}Ti_xO_3$ and $M^{III}$ is aluminum or gallium.

In other embodiments, the methods of fabrication are directed towards producing improved Q component comprising improved Q ceramic material having the formula, $$Ba_4M^{II}_{2-3x}Ln_{8+2x+y}Ti_{18-3x}M^{III}_{3y}O_{54},$$

whereby 0<x<⅔ and 0<y<⅔ and the material has an orthorhombic tungsten bronze crystal structure. $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium. In some other particular embodiments of the invention, the above composition is prepared in combination with $TiO_2$ (rutile) or a perovskite with the general formula $Nd_{1-1/3x}Ti_xO_3$ and $M^{III}$ is aluminum or gallium.

In other embodiments, the methods of fabrication are directed towards producing improved Q component comprising improved Q ceramic material having the formula, $$Ba_4(M^I_{0.5+a}Ln_{5-a})_{2-3x}Ln_{8+2x+y}Ti_{18-3y+a}M^{III}_{3y-a}O_{54},$$

where 0<x<⅔, 0<y<⅔, and −0.5<a<0.5 and the material has an orthorhombic tungsten bronze structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium. In some other particular embodiments of the invention, the above composition is prepared in combination with $TiO_2$ (rutile) or a perovskite with the general formula $Nd_{1-1/3x}Ti_xO_3$ and $M^{III}$ is aluminum or gallium.

DETAILED DESCRIPTION OF THE PREFERRED EMBODIMENT

Figure 1:
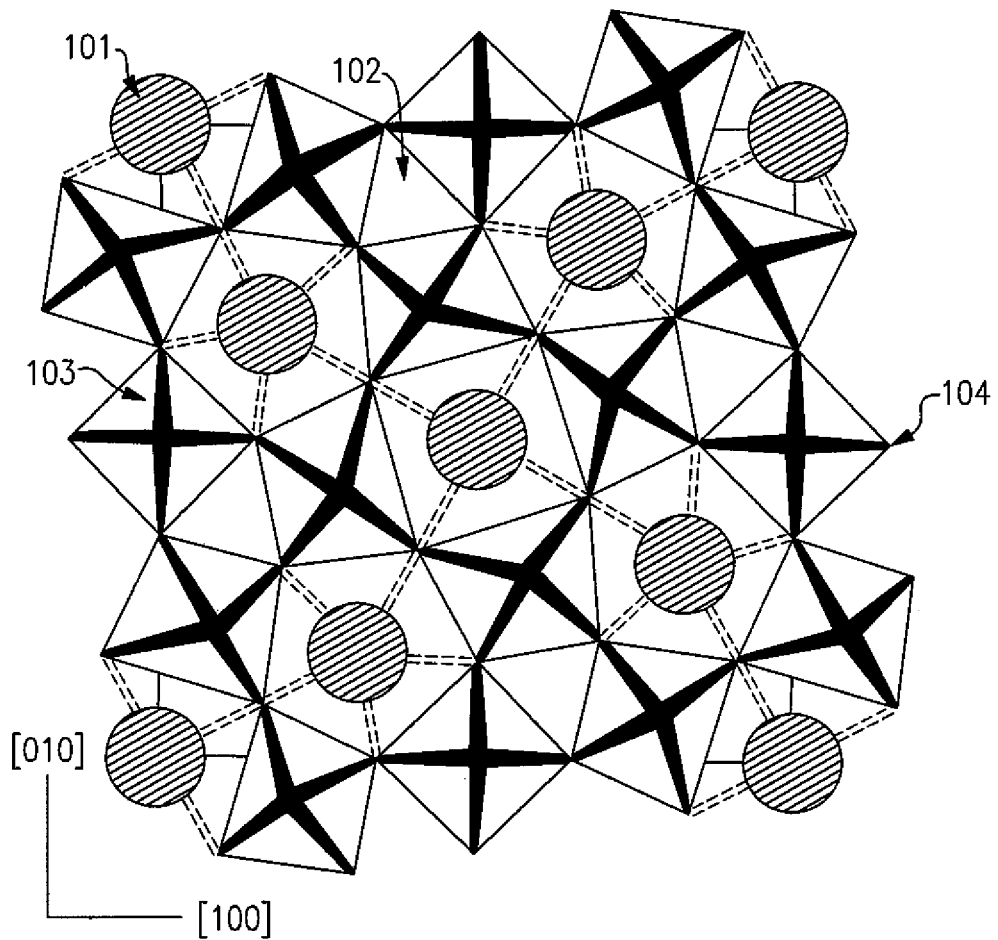
FIG. 1 illustrates the crystal structure of a generic orthorhombic tungsten bronze unit cell.

Disclosed herein is a framework for developing compositions and materials to expand the number of high quality factor (Q) ceramic dielectric materials available for electronic applications in the radio frequency (RF) range. Also disclosed herein are crystalline materials and compositions with high or improved Q that can be used in electronic components operating in the RF range. Also disclosed herein are methods of synthesis of crystalline materials with high or improved Q to produce the desired material and physical characteristics. The disclosed materials with high Q and methods of forming such materials can be used to improve the physical characteristics of electronic devices, such as antennas, resonators, circulators, and the like.

For electronic components operating in the RF range, some of the important physical characteristics are Q, the temperature coefficient of resonant frequency ($\tau_F$), and the dielectric constant ($\in_r$). Having the proper values for these physical characteristics allows for an electronic component to operate at an optimal level in differing environmental conditions. The disclosed materials exhibit favorable physical properties such as high or improved Q, improved dielectric constants, and a temperature coefficient of resonant frequency near 0, which are useful in the field of electronics.

Q is a dimensionless parameter that can characterize a resonator's bandwidth relative to its center frequency and can be defined as:

$$Q = 2\pi \times \frac{\text{Energy Stored}}{\text{Energy dissipated per cycle}}$$

$$= 2\pi f_r \times \frac{\text{Energy Stored}}{\text{Power Loss}}.$$

A system with a high Q stores a high level of energy as compared to the energy dissipated per cycle. A resonator with a high Q would resonate at greater amplitudes, but would have a small range of frequencies for resonating. Therefore, a material with a high Q would be more selective in resonating than a material with a low Q, thus allowing better filtration of other signals, but the resonator would be harder to tune due to the small range of frequencies. Moreover, a resonator with a sharp Q peak allows more channels to be inserted in a given bandwidth space. Therefore, many electronic materials are better suited when they are formed from a material with a high Q due to the lack of interference from other signals.

The temperature coefficient of resonant frequency ($\tau_F$), or temperature coefficient, embodies the relative change of resonant frequency when temperature is changed by 1K. The temperature coefficient is defined as:

$$R(T)=R(T_0)(1+\alpha\Delta T)$$

In the electronic device market, especially in the field of radio frequency, materials having a $\tau_F$ near 0 are highly sought after. The $\tau_F$, like many other physical characteristics, can change as the chemistry of the underlying material is altered. Adjusting $\tau_F$ can be done by adjusting the prevalence of certain elements within a structure, as the change of elements can cause or reduce strain on a crystal structure. A high positive or high negative value for $\tau_F$ in a material would limit the use of the material in radio frequency electronics as the resonant frequency would vary greatly based on temperature changes, thus limiting the use of a device in areas where temperatures range by a significant amount. If a $\tau_F$ value of 0 is achieved, the resonant frequency will remain constant regardless of the temperature of the material.

The dielectric constant ($\in_r$) is a dimensionless value for the relative permittivity of a material under certain conditions. It illustrates the amount of electric energy stored in a material by an applied voltage, relative to the amount stored in a vacuum. Moreover, $\in_r$ can also be used to show the ratio of capacitance using the material as compared to a capacitor in a vacuum. If a material with a high $\in_r$ is put into an electric field, the magnitude of the field will be greatly reduced within the material.

Preferred embodiments of the present disclosure are directed to compositions and materials based on tungsten bronze crystal structures. FIG. 1 illustrates the front view of a generic orthorhombic tungsten bronze crystal structure. In three dimensions, the structure is a rectangular prism wherein the three edges all have different sizes. This differs from a tetragonal tungsten bronze (TTB) crystal structure wherein two of the three edges have the same dimensions. The framework of an orthorhombic tungsten bronze crystal structure includes four A type sites 101, which hold barium or other similar elements, ten B type sites 102, which hold the rare earth elements or other elements such as sodium, eighteen C type sites 103, which hold metallic elements such as titanium and aluminum, and fifty four oxygen sites 104. In an orthorhombic tungsten bronze crystal structure, the A type site is larger than the B type site which is larger than the C type sites. Different combinations of atoms in the above mentioned crystal structure can enhance certain properties within the material. However, very dissimilar sized atoms in the different sites can also negatively affect the physical characteristics of the material. If too large or too small of an element were inserted into one of the sites, strain would be placed on the crystal structure, which has the tendency to lower physical characteristics such as Q, the temperature coefficient of resonant frequency, or the dielectric constant. Therefore, to create an improved Q material, the appropriate ions must be inserted into the appropriate site in the structure.

Changes in ion size can cause bond angle shifts in a crystal structure. For example, a larger ion will reduce the tilt angle in the crystal. However, any statistical anomalies within a crystal structure, such as bond length variation due to divergent ionic sizes, can result in the drastic decrease of useful physical characteristics in crystal materials. Nevertheless, crystal materials can be positively modified by changing the octahedral tilt of the crystal structure through incorporating cationic atoms with preferred radii to provide desirable physical characteristics, such as increasing Q or improving $\tau_F$.

Along with the appropriate ion size, enhancing Q of crystalline materials may also require keeping the overall charge balance of a crystal structure at 0. Without being bound by theory, it is believed that if the charge balance strays away from neutral, physical characteristics in the crystalline material may deteriorate.

In some embodiments, the crystalline material may contain crystals with crystallographic anisotropy. If a material is anisotropic, certain physical properties of a material are directionally dependent with the crystal structure. An example of an anisotropic material is wood, which has certain properties when forces act with the grain and another set of properties when forces act against the grain. The thermal expansion coefficient, dielectric constant, and temperature coefficient of resonant frequency of the crystalline material may all depend on the crystallographic direction. Also, certain methods of formation of the crystalline material of certain preferred embodiments impart a preferred orientation to the crystal structure, which will drastically affect the physical characteristics. Certain physical characteristics of the crystalline materials may have extreme sensitivity to firing conditions, especially the temperature coefficient of resonant frequency, due to the firing imparting a certain crystallographic direction.

The physical characteristics of the crystalline material with enhanced Q can also be adjusted by incorporating modifying agents. For example, some embodiments of can involve incorporating one or more modifying agents or elements selected from the lanthanide, or rare earth metal, element series. Non-limiting examples of modifying elements include lanthanide series elements selected from yttrium, lanthanum, praseodymium, neodymium, samarium, gadolinium, dysprosium, holmium, thulium, erbium, ytterbium, or lutetium. Other non-limiting, non-lanthanide examples of modifying elements include sodium, potassium, copper, aluminum, and gallium.

Framework

Figure 2:
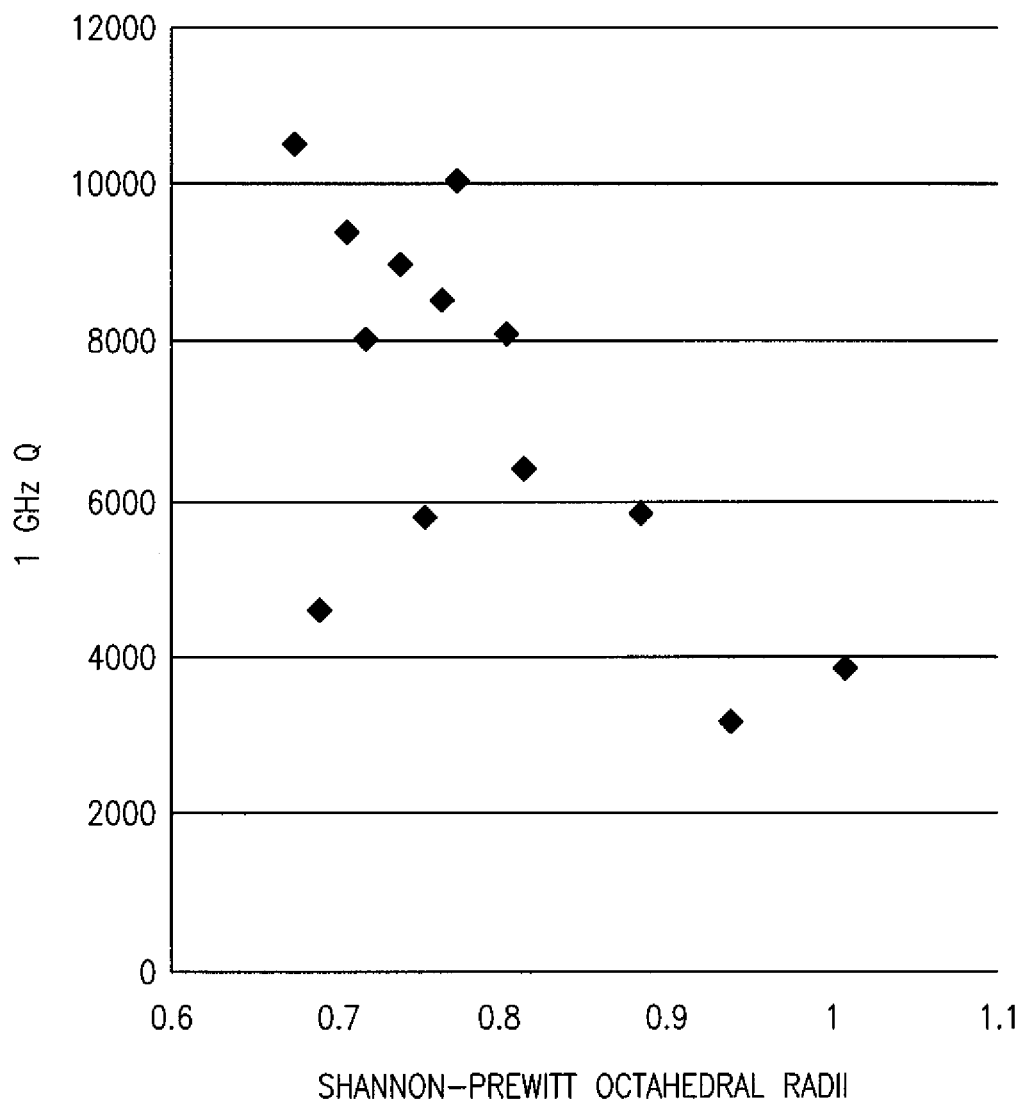
FIG. 2 illustrates the effect of changing the average ionic size on the 1 GHz Q for $Ba_4Nd_{6.16}Sm_{3.4}Ti_{17.32}Al_{0.68}O_{54}$.
Figure 3:
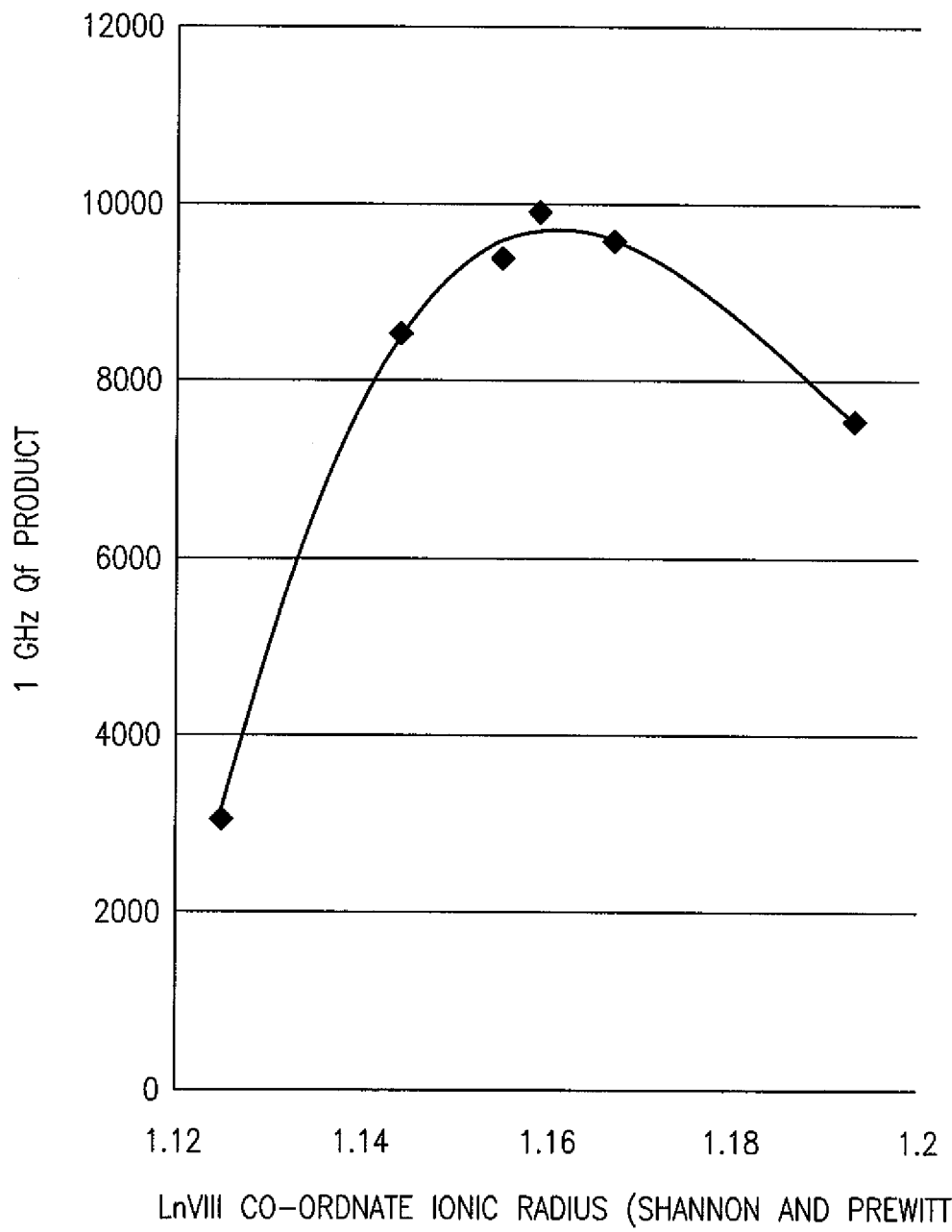
FIG. 3 illustrates the 1 GHz Q as a function of $Ln^{3+}$ ionic radius for $Ba_4Nd_{8.8}Ln_{0.8}Ti_{17.2}Al_{0.8}O_{54}$.
Figure 4:
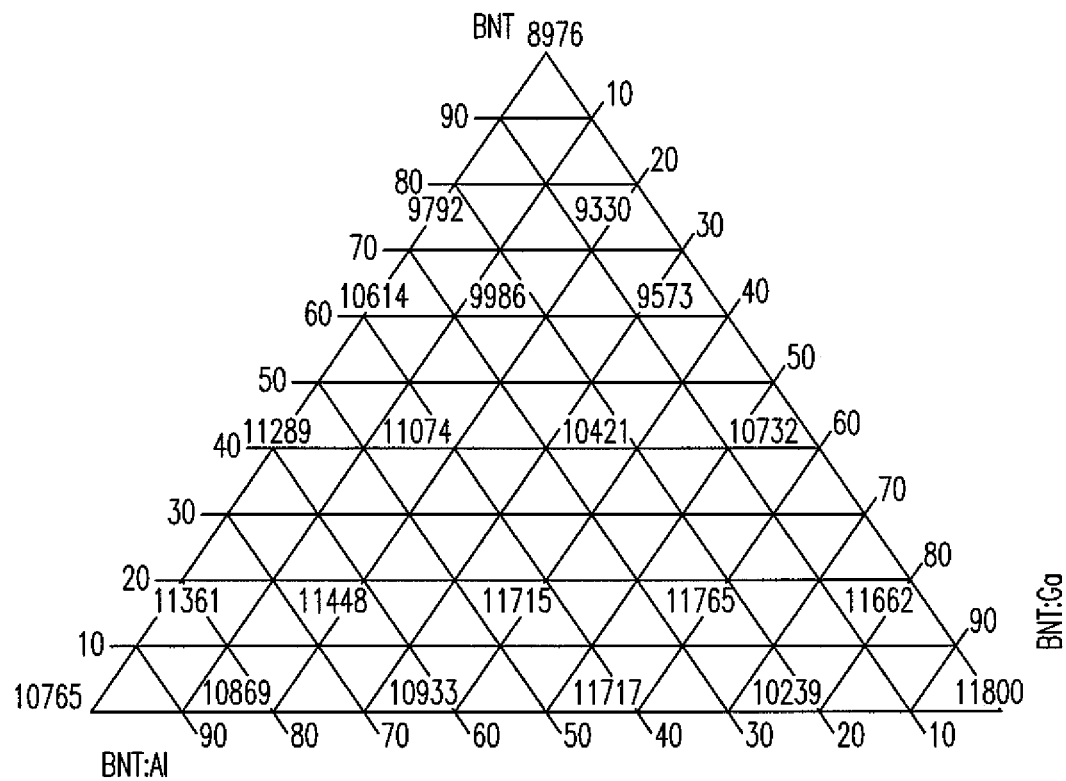
FIG. 4 illustrates the 1 GHz Q as a function of a ternary composition of BaNdTiGaO and BaNdTiAlO systems.

Without being bound by theory, it is believed that for certain tungsten bronze crystal systems such as:

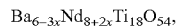

with $x<\frac{2}{3}$, substituting strontium (ionic radius=1.35) for barium (ionic radius=1.56) improves the physical characteristics when there are greater than 4 formula units of barium within the crystal structure, as this substitution makes the A sites closer in size to the lanthanide ions which currently occupy that crystallographic site (ionic radius ranges from 1.3-1.19). FIGS. 2 and 3 illustrate how changing the ionic radius in a crystal structure can have a drastic effect on Q. Based in part on these premises, a framework for designing a variety of different compositions and dielectric materials with improved Q can be developed. In some embodiments, Q begins at a low value for values of x near 0 and increases as a function of $Ln^{3+}$ amount. However, Q decreases rapidly after reaching an x value of approximately $\frac{2}{3}$. This effect is most likely because at $x=\frac{2}{3}$, the crystal structure contains the lowest strain due to the properly sized atoms contained within the crystal structure. FIG. 4 illustrates how changing compositions of improved Q ceramic materials can have a drastic effect on Q values, depending on the relative percentages of the elements within the structure.

In some further embodiments, the invention provides compositions and materials comprising a multiple lanthanide system such as $Ba_4Ln_8Ln'_{4/3}Ti_{18}O_{54}$, $Ba_4Ln_8Ln'_2Ti_{16}Al_2O_{54}$, and $Ba_2K_2Ln_8Ln'_2Ti_{18}O_{54}$, whereby Ln can include lanthanum, praseodymium, neodymium, samarium, and gadolinium and Ln' can include lanthanum, praseodymium, neodymium, samarium, gadolinium, holmium, yttrium, erbium, ytterbium, and indium. In some embodiments, enhanced physical characteristics such as Q, $\in_r$, and $\tau_F$ have been achieved through various substitutions and modifications of the crystal structure contained in the system. The following non-limiting examples illustrate some of the compositions and materials of certain preferred embodiments: $Ba_4Nd_8Sm_2Ti_{16}Al_2O_{54}$, $Ba_4Nd_8Y_2Ti_{16}Al_2O_{54}$, and $Ba_4Nd_8Ho_2Ti_{16}Al_2O_{54}$. In certain embodiments, partial removal of vacancies can be used to tune $\tau_F$. In other embodiments, various modifications and substitutions can be made to the formulation to enhance Q. For example, in one embodiment, by substituting $Ti_{0.1}$ with $Ge_{0.1}$ in $Ba_4Nd_{6.16}Sm_{3.4}Ti_{17.32}Al_{0.68}O_{54}$, Q can be enhanced to about 12397 at 1.14 GHz.

Ceramic Material Compositions with Enhanced Q

Certain preferred embodiments of the invention relate to modified ceramic material compositions with enhanced Q useful in electronic devices operating in the radio frequency range. Other physical characteristics such as $\in_r$, and $\tau_F$ can be improved as well. These physical characteristics can be manipulated by adding or changing elements within a given crystal structure.

The modified ceramic material composition according to one embodiment can be represented by the formula:

$$Ba_4M^{II}_{2-3x}Ln_{8+3x}Ti_{18-3x}M^{III}_{3x}O_{54},$$

whereby $x \leq 2/3$. The material preferably has an orthorhombic tungsten bronze crystal structure. In one implementation, $M^{II}$ is one of calcium or strontium, Ln is at least one element from the lanthanide, or rare earth element, series including yttrium, lanthanum, praseodymium, neodymium, samarium, gadolinium, dysprosium, holmium, thulium, erbium, ytterbium, or lutetium, and $M^{III}$ is one of aluminum or gallium.

The modified ceramic material composition according to another embodiment can be represented by the formula:

$$Ba_4(M^I_{0.5}Ln_{0.5})_{2-3x}Ln_{8+3x}Ti_{18-3x}M^{III}_{3x}O_{54},$$

whereby $x \leq 2/3$. The material preferably has an orthorhombic tungsten bronze crystal structure. $M^I$ is one of sodium, potassium, or copper, Ln is at least one element from the lanthanide series including yttrium, lanthanum, praseodymium, neodymium, samarium, gadolinium, dysprosium, holmium, thulium, erbium, ytterbium, or lutetium, and $M^{III}$ is one of aluminum or gallium. In some particular implementations, Ln consists essentially of neodymium and $M^I$ consists essentially of sodium.

The modified ceramic material composition according to another embodiment can be represented by the formula:

$$Ba_4M^{II}_{2-3x}Ln_{8+2x+y}Ti_{18-3x}M^{III}_{3y}O_{54},$$

whereby $0 < x < 2/3$ and $0 < y < 2/3$. The material preferably has an orthorhombic tungsten bronze crystal structure. $M^{II}$ can be one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ can be one of aluminum or gallium. In some particular implementations, Ln consists essentially of neodymium.

The modified ceramic material composition according to another embodiment can be represented by the formula:

$$Ba_4(M^I_{0.5+a}Ln_{5-a})_{2-3x}Ln_{8+2x+y}Ti_{18-3y+a}M^{III}_{3y-a}O_{54},$$

whereby $0 < x < 2/3$, $0 < y < 2/3$, and $-0.5 < a < 0.5$. The material preferably has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium.

Figure 5:
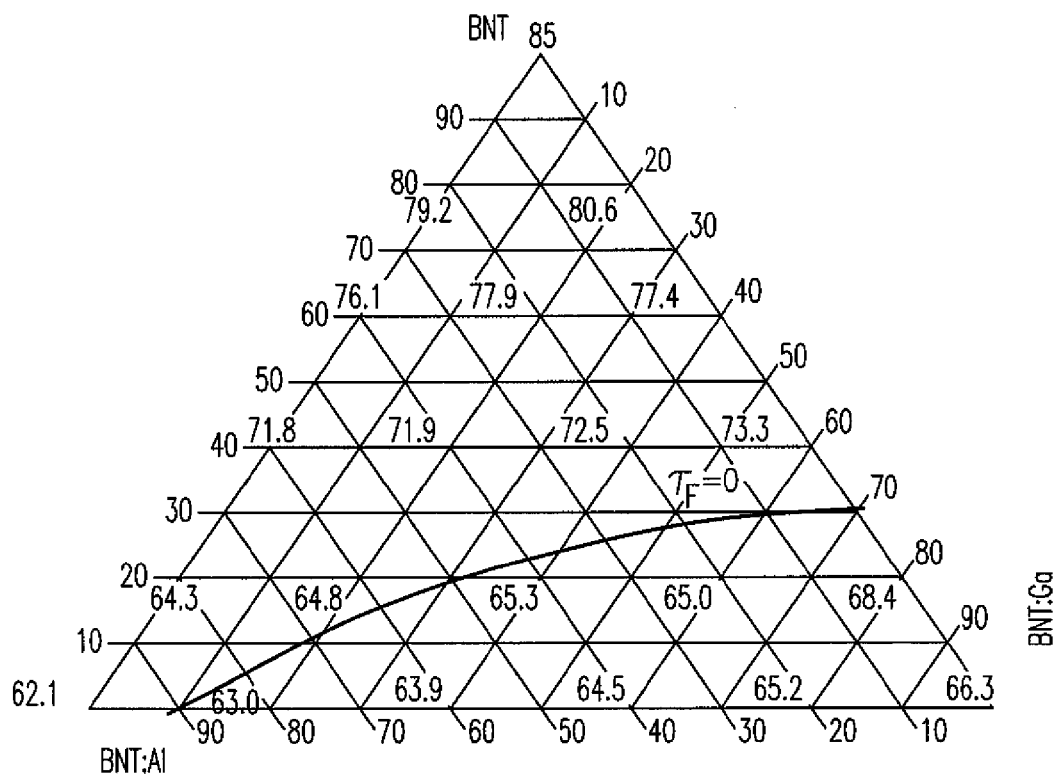
FIG. 5 illustrates $\in_r$ as a function of a ternary composition of BaNdTiGaO and BaNdTiAlO systems.

In some further embodiments, the compositions and materials comprise an orthorhombic tungsten bronze crystal structure with the formula:

$$Ba_4Ln_8[Ba_{2-3x}Ln_{2x}V_x]Ti_{18}O_{54},$$

whereby Ln can include lanthanum, praseodymium, neodymium, samarium, europium, and gadolinium. In some embodiments, substitutions to Ln and barium or aluminum and gallium can be made to adjust various properties of the material such as the dielectric constant. FIG. 5 illustrates the effect on the dielectric constant based on x as well as differing composition of the material. For example, $Bi^{3+}$ can substitute for $Ln^{3+}$ and $Pb^{2+}$ can substitute for $Ba^{2+}$. The resulting material has favorable electrical and magnetic properties, such as improved Q and dielectric constants, for use in RF applications, particularly, but not limited to, miniaturized cavity resonators in the 500 MHz to 1 GHz range.

In certain embodiments of the present invention, germanium is incorporated for titanium and can produce some of the most enhanced Q results. It is believed that this occurs because germanium has an ionic radius that is slightly lower than that of titanium, which slightly optimizes the tilt angles. Therefore, strain is reduced in the crystal structure, producing improved Q values. Also, substituting gallium for titanium can result in different, albeit still improved Q characteristics due to the relative closeness of ionic size between the two elements.

Combination with Rutile/Perovskite

One or more further aspects of the invention involve material compositions having a primary phase comprising an enhanced Q ceramic material formed according to a preferred embodiment, and one or more additional phases comprising a material that modifies one or more physical characteristics of the primary enhanced Q ceramic material. For example, an enhanced Q ceramic material can be prepared in combination with compositions such as $TiO_2$ (rutile) or a perovskite with the general formula $Nd_{1-1/3x}M^{III}_{1-x}Ti_xO_3$ where $M^{III}$ is aluminum or gallium. Advantageously, the compositions, materials, and methods described herein can be used to produce improved Q materials with dielectric constants up to at least 83 and provides a framework for additional additives and composites to considerably expand the number of improved Q compositions available. Certain aspects of the present invention relate to enhanced temperature compensated materials with a Q factor close to about 10,000 at 1 GHz and a dielectric constant range of about 65 to 85. In certain preferred embodiments, the material is used for TM rods for 700 MHz 1 GHz applications.

Composition changes based on the x value can also have an effect on the temperature coefficient of resonant frequency. A high positive or high negative value for $\tau_F$ in a material would limit the use of the material in radio frequency electronics. If a $\tau_F$ value of 0 is achieved, the resonant frequency will remain constant regardless of what temperature the material is at.

Figure 6:
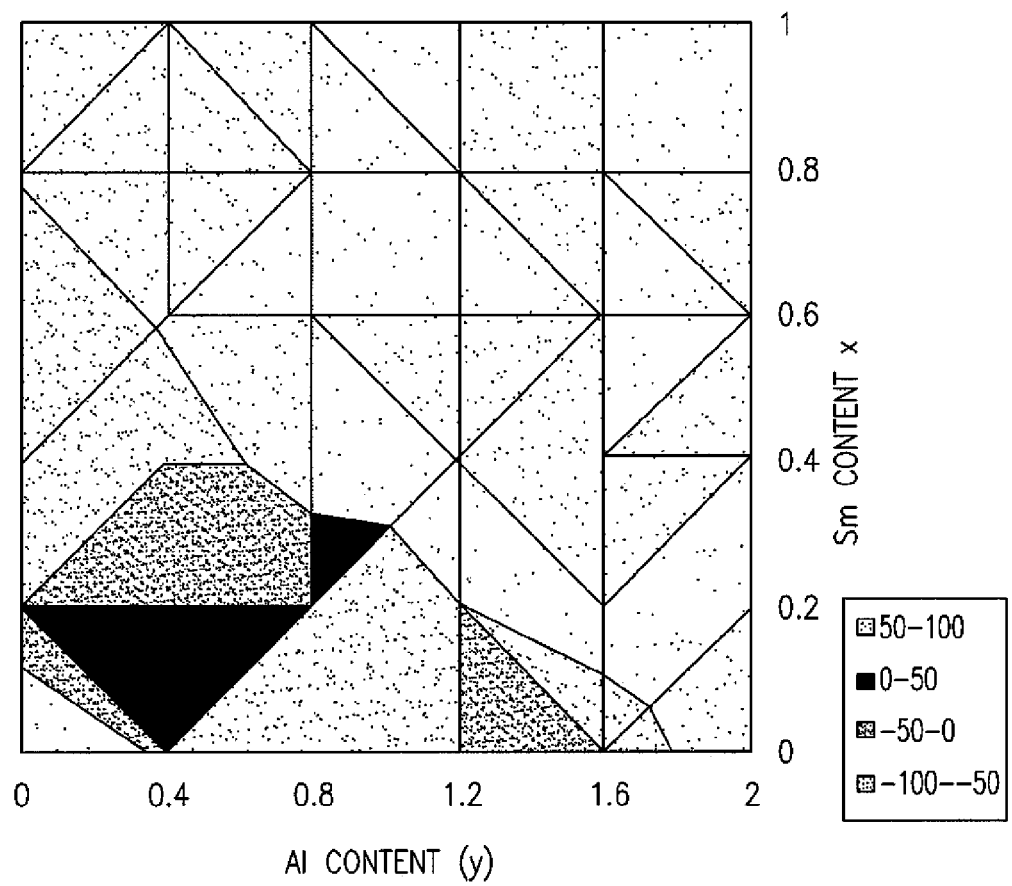
FIG. 6 illustrates $\tau_F$ as a function of samarium and aluminum content for $Ba_4(Nd_{1-x}Sm_x)_{28/3+y/3}Ti_{18-y}Al_yO_{54}$.

Without wishing to be bound by theory, it is believed that compounds with tetragonal tungsten bronze crystal structures (TTB) based on $Ba_4Nd_{10}Ti_{16}Ga_2O_{54}$ have a negative temperature coefficient, while most other compounds in the system containing neodymium have a positive temperature coefficient. Moreover, low x value (x<⅔) members of certain systems such $Ba_{6-3x}Nd_{8+2x}Ti_{18}O_{54}$ are chemically compatible with $TiO_2$ (rutile) and perovskites with the general formula $Nd_{1-1/3x}Ti_xO_3$, which both have improved Qs and dielectric constants but also has a very large positive temperature coefficients of resonant frequency. Nevertheless, the combination of systems in the present invention allows for minimal temperature coefficient values, as close to 0 ppm/° C. as possible, including combinations around ±6 ppm/° C., which are highly regarded for RF products. FIG. 6 illustrates how the temperature coefficient changes based on aluminum and samarium content in a system, and how to minimize the temperature coefficient. The Q value in the system is maximal at x=⅔ and drops off rapidly for x<⅔ or x>⅔.

Figure 7:
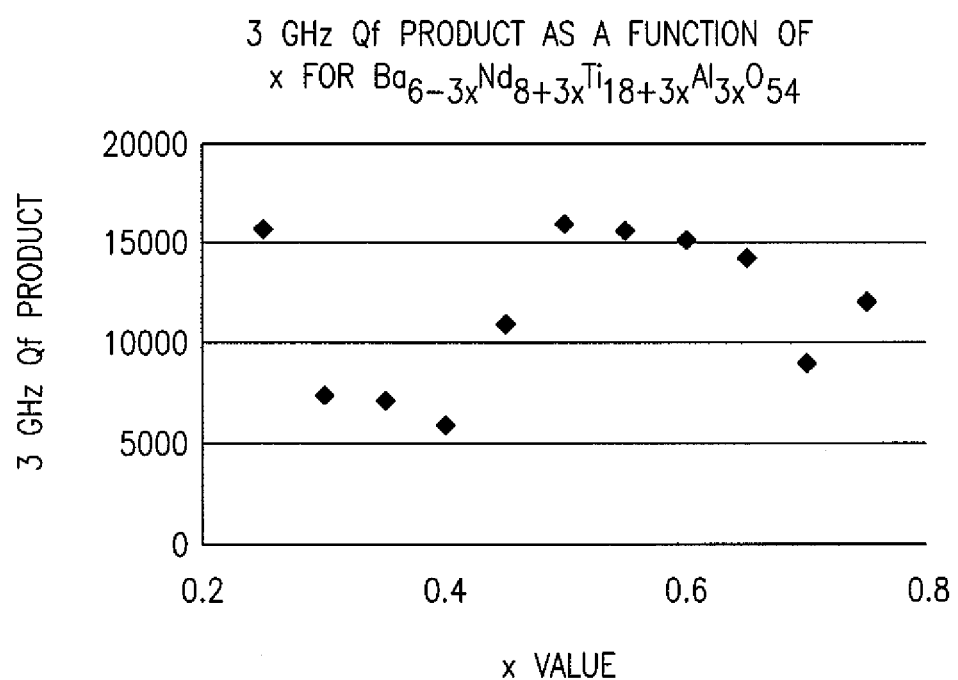
FIG. 7 illustrates the effect of changing compositions on the 3 GHz Q in $TiO_2$—BaNdTiAlO compounds.
Figure 9:
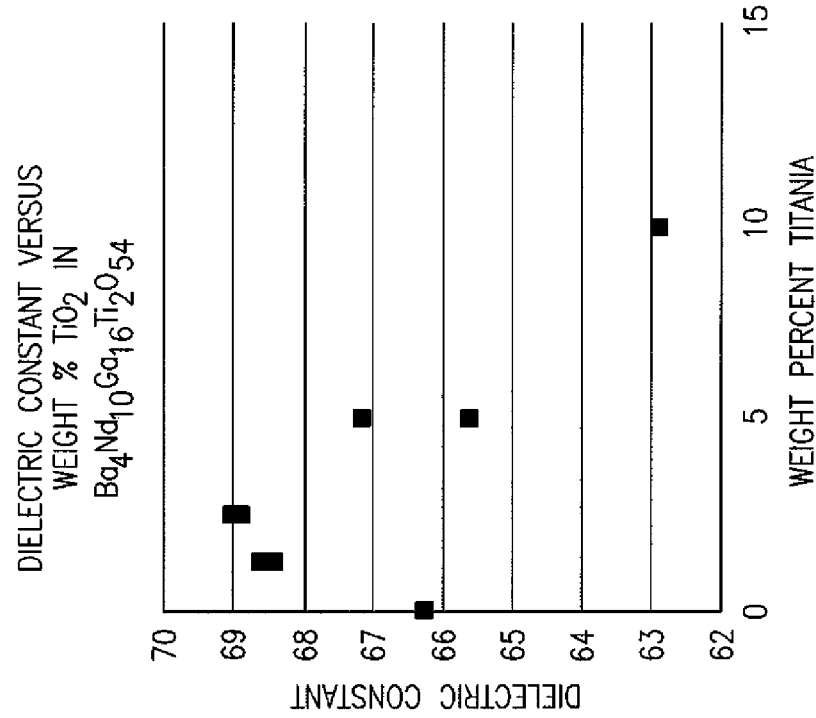
FIGS. 8 and 9 illustrate the Q and dielectric constant v. weight percentage $TiO_2$ in $Ba_4Nd_{10}Ga_{16}Ti_2O_{54}$.
Figure 8:
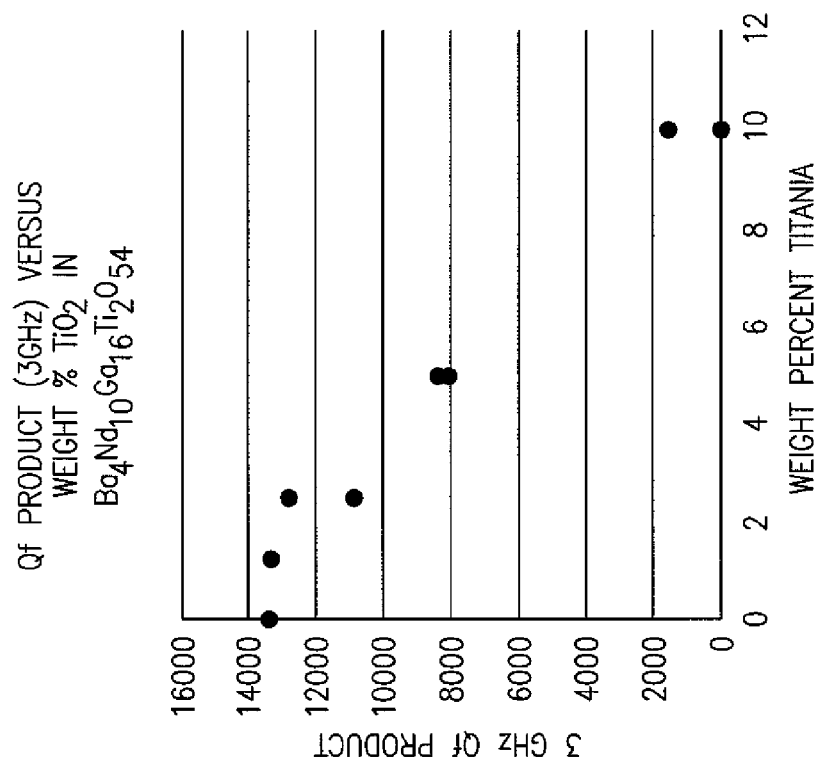

FIGS. 7-9 illustrate how the addition of rutile into improved Q ceramic can have drastic effects on the physical properties of the material. These phase diagrams show the compatibility of certain crystal structures with rutile. If rutile or perovskite was added incorrectly to a system, or if the system was incompatible with rutile or perovskite, it would drastically reduce Q.

The modified ceramic material composition according to one embodiment can be represented by the formula:

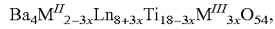
$$Ba_4M^{II}_{2-3x}Ln_{8+3x}Ti_{18-3x}M^{III}_{3x}O_{54},$$

whereby x≤⅔ and the material has an orthorhombic tungsten bronze crystal structure. In one implementation, $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some embodiments, the above composition is prepared in combination with $TiO_2$ (rutile) or a perovskite with the general formula $Nd_{1-1/3x}M^{III}_{1-x}Ti_xO_3$ and $M^{III}$ is aluminum or gallium.

The modified ceramic material composition according to another embodiment can be represented by the formula:

$$Ba_4(M^I_{0.5}Ln_{0.5})_{2-3x}Ln_{8+3x}Ti_{18-3x}M^{III}_{3x}O_{54},$$

whereby x≤⅔ and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium. In some other particular embodiments, the above composition is prepared in combination with $TiO_2$ (rutile) or a perovskite with the general formula $Nd_{1-1/3x}M^{III}_{1-x}Ti_xO_3$ and $M^{III}$ is aluminum or gallium.

The modified ceramic material composition according to another embodiment can be represented by the formula:

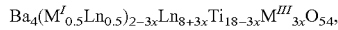
$$Ba_4M^{II}_{2-3x}Ln_{8+2x+y}Ti_{18-3x}M^{III}_{3y}O_{54},$$

whereby 0<x<⅔ and 0<y<⅔ and the material has an orthorhombic tungsten bronze crystal structure. $M^{II}$ can be one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ can be one of aluminum or gallium. In some particular embodiments of the invention, Ln consists essentially of neodymium. In some other particular embodiments of the invention, the above composition is prepared in combination with $TiO_2$ (rutile) or a perovskite with the general formula $Nd_{1-1/3x}Ti_xO_3$ and $M^{III}$ is aluminum or gallium.

The modified ceramic material composition according to another embodiment can be represented by the formula:

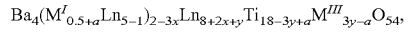
$$Ba_4(M^I_{0.5+a}Ln_{5-1})_{2-3x}Ln_{8+2x+y}Ti_{18-3y+a}M^{III}_{3y-a}O_{54},$$

whereby 0<x<⅔, 0<y<⅔, and −0.5<a<0.5 and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium. In some other particular embodiments of the invention, the above composition is prepared in combination with $TiO_2$ (rutile) or a perovskite with the general formula $Nd_{1-1/3x}Ti_xO_3$ and $M^{III}$ is aluminum or gallium.

Radio Frequency Components

One or more aspects of the present invention can also pertain to methods of fabricating RF components utilizing such materials. One or more methods can comprise blending a precursor mixture of compounds comprising a barium source, a titanium source, at least one lanthanide series element, and at least one metal source; calcining the material at the appropriate temperature; milling the material to the appropriate size; forming the ceramic using methods known in the art; and sintering the improved Q ceramic to produce improved Q components comprising improved Q ceramic material having a formula:

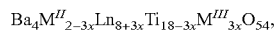
$$Ba_4M^{II}_{2-3x}Ln_{8+3x}Ti_{18-3x}M^{III}_{3x}O_{54},$$

whereby x≤⅔ and the material has an orthorhombic tungsten bronze crystal structure. In one implementation, $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some embodiments of the invention, the above composition is prepared in combination with $TiO_2$ (rutile) or a perovskite with the general formula $Nd_{1-1/3x}M^{III}_{1-x}Ti_xO_3$ and $M^{III}$ is aluminum or gallium, or improved Q component comprised of improved Q ceramic material having a formula,

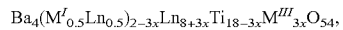
$$Ba_4(M^I_{0.5}Ln_{0.5})_{2-3x}Ln_{8+3x}Ti_{18-3x}M^{III}_{3x}O_{54},$$

whereby x≤⅔ and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium. In some other particular embodiments, the above composition is prepared in combination with $TiO_2$ (rutile) or a perovskite with the general formula $Nd_{1-1/3x}M^{III}_{1-x}Ti_xO_3$ and $M^{III}$ is aluminum or gallium.

In other embodiments, the improved Q component is comprised of improved Q ceramic material having the formula,

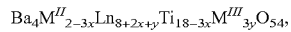
$$Ba_4M^{II}_{2-3x}Ln_{8+2x+y}Ti_{18-3x}M^{III}_{3y}O_{54},$$

where $0<x<2/3$ and $0<y<2/3$ and the material has an orthorhombic tungsten bronze crystal structure. $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium. In some other particular embodiments of the invention, the above composition is prepared in combination with $TiO_2$ (rutile) or a perovskite with the general formula $Nd_{1-1/3x}Ti_xO_3$ and $M^{III}$ is aluminum or gallium, or improved Q component comprising improved Q ceramic material having the formula,

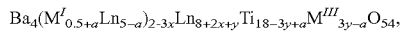

$$Ba_4(M^I_{0.5+a}Ln_{5-a})_{2-3x}Ln_{8+2x+y}Ti_{18-3y+a}M^{III}_{3y-a}O_{54},$$

where $0<x<2/3$, $0<y<2/3$, and $-0.5<a<0.5$ and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium. In some other particular embodiments of the invention, the above composition is prepared in combination with $TiO_2$ (rutile) or a perovskite with the general formula $Nd_{1-1/3x}Ti_xO_3$ and $M^{III}$ is aluminum or gallium.

One or more aspects of the invention can involve doping or including additives to the modified improved Q ceramic material with one or more doping agents that modify any one of the physical characteristics of the ceramic component. This can include changing the crystalline morphology, or crystal growth characteristic of the bulk body of the dielectric ceramic component, the sintering behavior of the dielectric ceramic material, and the densification behavior of the dielectric ceramic material. In some implementations, the composition includes doping small amounts, preferably about 1% by weight, of cerium, manganese, copper, zinc, niobium, silicon, tin, zirconium, germanium, or combinations thereof as a sintering aid or to adjust the lattice parameter to optimize Q. These examples are non-limiting and other elements can be used to achieve desired properties in the material.

Processing

Figure 10:
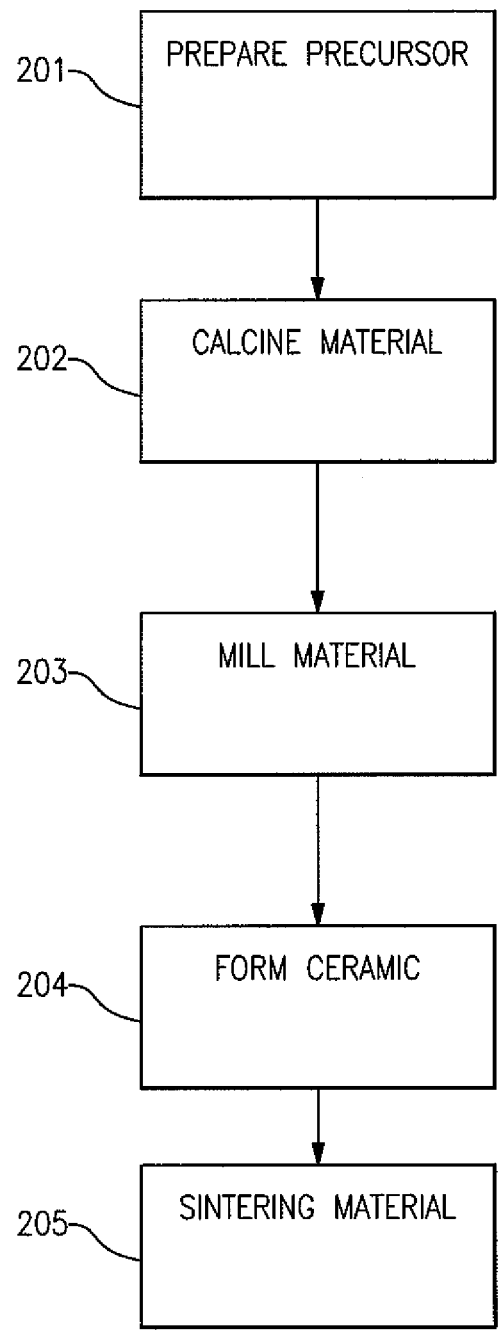
FIG. 10 provides a flow diagram illustrating a method of preparing the compositions of certain preferred embodiments.

FIG. 10 illustrates the fabrication process which typically involves providing or preparing a mixture of precursor compounds 201. In one embodiment the precursor comprises, but is not limited to, $BaCO_3$, $TiO_2$, $Ln_2O_3$, $Al_2O_3$, $NaHCO_3$, and $Ga_2O_3$. In another embodiment, the precursor comprises, but is not limited to, $BaCo_3$, $TiO_2$, $Ln_2O_3$, $Al_2O_3$, $GeO_2$, $ZrO_2$, $SnO_2$, $MnO_2$, $CeO_2$, and other oxides. The relative amounts of the precursor compounds can be provided to result in improved Q ceramic composition with a single primary phase, not including any other additional phases which could adversely affect the physical properties of the material. However, in some embodiments of the invention, the material will contain a primary phase along with one or more secondary phases. Embodiments with an additional phase, which can be present between the primary phase grains, can be implemented by incorporating greater than stoichiometric amounts of each of the one or more corresponding precursor compounds in the mixture. Other phases can be incorporated into the structure by the addition of rutile or perovskite. All of these secondary phases can have drastic effects on the physical characteristic of a material, such as the Q, the temperature coefficient of resonant frequency, and the dielectric constant.

After the precursor is formed, the mixture of precursor compounds is then typically dry or wet blended until the mixture is homogeneous. Blending can be performed by any one or more of propeller mixing, ball milling, and vibratory milling, along with any other blending known to one skilled in the art.

If wet blending is used, the wet blended mixture is typically dried by either spray drying or by pan drying until it has a desired viscosity or slump characteristics. For example, drying can be performed until the resultant mixture no longer behaves as a slurry, but instead as a material with a higher viscosity. Although drying is preferred when wet blending is used, the mixture may still contain as much as, or greater than, 75 wt. % of water or the blending agent. Drying can be performed by pan drying the mixture at a temperature that vaporizes the liquid agent or the water, e.g., at a temperature in a range of about 50° C. to about 300° C., such as at about 200° C.

Reaction of the precursor compounds into the orthorhombic tungsten bronze improved Q ceramic material can be promoted by calcining the blended mixture in an oven 202. The material is calcined by raising the oven temperature at a rate in a range from about 5° C. per hour to about 300° C. per hour in one or more heat soaking periods. Preferably, the heating ramp rate is in a range of between about 50° C. per hour to about 150° C. per hour. The one or more heat soaking periods can be performed at an oven temperature in a range of between about 1,000° C. to about 1,400° C. The preferred heat soaking temperature can vary depending on, for example, the composition of the improved Q dielectric ceramic material product and, in some cases, the type of precursor compound. A non-limiting preferred heat soaking temperature is in a range of between about 1,150° C. and about 1,200° C. Heat soaking temperatures below about 1,000° C. may not sufficiently promote reaction into the appropriate structure, which can result in unreacted phases in the composition, leading to materials that underperform. Heat soaking temperatures above about 1,400° C. may cause melting, at least partially, of the barium neodymium titanate lattice structure, which can result in incomplete incorporation of the modifying elements in the orthorhombic tungsten bronze lattice. Heat-treating at the heat soaking temperature can be performed until the reaction has sufficiently progressed to form the improved Q ceramic material. For example, heat soaking can be performed for a period in a range from about two hours to about sixteen hours, preferably in a range of between about four hours and about twelve hours, more preferably for about eight hours. The duration of the heat soaking or calcining period may depend on the element composition of the improved Q ceramic material, and, in some cases, the relative compositions of the modifiers in the material as well as the amount of modifiers added into the material. Depending on, for example, the improved Q ceramic material product, calcining periods of less than about four hours may not sufficiently react or convert the precursor compounds into green material reaction process. Further, the next steps in synthesizing the material can involve cooling the material that has at least partially reacted into green material to about room temperature, typically about 20° C. to about 25° C. Cooling can be performed at a rate in a range of from about 5° C. per hour to about 600° C. per hour. For example, cooling can be performed by reducing the temperature of the oven containing the green material at a rate of about 100° C. per hour.

The green material is typically milled, ground, or comminuted to particles 203 with a target dimension or diameter by ball milling, attrition milling, or vibratory milling with, for example, 5 mm diameter balls of yttria-stabilized zirconia, magnesia-stabilized zirconia, and/or ceria-stabilized zirconia. Water or an inert carrier fluid, such as acetone, can be used to facilitate milling and achieve the desired material size. For example, milling can be performed to provide particles with an average diameter in a range from about 0.5 microns to about 10 microns. If advantageous to do so, particles with less than a predetermined threshold dimension, or diameter, can be separated by, for example, sieving. The particles of the improved Q ceramic material can be spherically shaped or substantially spherically shaped, depending on the comminuting of the material. However, one or more aspects of the present invention can be practiced with non-spherical shapes. Indeed, some embodiments of the present invention use an aggregation of particles having differing shape or size characteristics, or both, to create different physical characteristics. For substantially spherical particles, the nominal diameter can be considered as the equivalent diameter of a hypothetical sphere having the same volume as the particle. Thus, the average nominal diameter can be considered an average equivalent diameter of hypothetical spherical particles having the same volume.

The comminuted green particles can then be formed into a green improved Q member 204. Forming can be accomplished by any of pressing, such as uniaxial pressing, cold isostatic pressing, extruding, hot isostatic pressing with an inert gas, hand die pressing, or by any other technique known to persons of ordinary skill in the art.

A binder, for example about less than 2 wt. %, may be added to the green particles to facilitate formation of the green member. The amount of binder may vary depending on, for example, the type of binder and the physical characteristics of the particles, such as, but not limited to particles size and the granularity of the particles. Too much binder, however, may change the density of the material and create gaps in the component. A non-limiting example of a binder that can be used is polyvinyl alcohol. To further facilitate the forming procedure, one or more plasticizers, such as polyethylene glycol, may be utilized with the binder. The amount of the plasticizer utilized may similarly be dependent on the type of binder and the physical characteristics of the particles.

Forming the particles into a desired component can be effected to provide a shaped article having a density that is at least about 50% of the theoretical density of the final improved Q ceramic material. For example, the particles can be pressed at a pressure of at least about 2,000 psi, for example, at about 40,000 psi. Pressing the material at this pressure would typically provide formed green improved Q members having a density that is at least about 55%, typically between about 55% and about 65%, of the theoretical density of the improved Q ceramic material.

One or more dopant compounds may be added to the material prior to milling the green material or prior to forming the green improved Q member, or both. Preferably, adding the one or more dopant compound involves, for example, mixing such dopant compound with the green material, and then milling the mixture thereof to the appropriate size. However, mixing the one or more dopant compounds may also involve mixing with the particles having the maximum threshold dimensions.

As noted, in embodiments comprising one or more phases, material of the second phase may be added to the green material. As with the one or more dopant compounds, the one or more second phase precursor compounds may be added prior to grinding or comminution of the green material.

Figure 11:
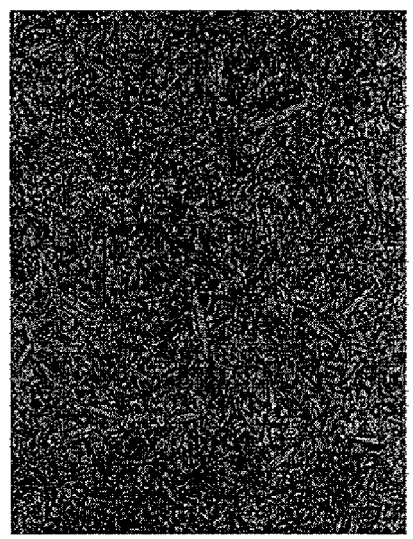
FIG. 11 illustrates the microstructure of Ge-doped material.

FIG. 11 illustrates how the microstructure of improved Q materials shows elongated grains once properly sintered. The green improved Q member, which can optionally have the one or more second phase precursor compounds and the one or more dopant compounds, can be sintered into an improved Q component 205, which can be useful for electronic applications, such as in the field of radio frequency. Sintering can be performed in an air or oxygen-containing atmosphere for a period and at a temperature, or for a plurality of durations and the same or at various temperatures. Modifications to the time and temperature can effect densification of the material and, in some cases, to complete the solid state reaction. Some embodiments of the invention can involve sintering to provide particular material or physical characteristics, such as improved Q levels. In some implementations, the temperature and oxygen pressure depend on the composition of the material. For example, sintering can be performed at one or more conditions that provide preferred grain characteristics or crystal structures, such as an orthorhombic tungsten bronze crystal structure. Sintering can be performed by heating or exposing the green member to one or more sintering temperatures with certain heating rates. The shape and geometry of the member and its physical and physical properties may affect the effective heat transfer behavior of the member. Thus, for example, the heating rate can depend on the shape of the member and the thermal conductivity of the material. In non-limiting embodiments of the invention, heating can be performed at a rate that is in the range of about 50° C. per hour to about 200° C. per hour. The size, shape, and composition of the material may also influence the duration of the sintering temperature. Thus, depending on at least such factors, one or more sintering temperatures may be used and the one or more durations of exposure at such temperature, or at a plurality of temperatures, can be in a range from about 1,350° C. to about 1,550° C. The sintering duration at can be performed for corresponding sintering durations that are in a range of from about one hour to about ten hours, preferably, in a range of about three to about eight hours. Steps after sintering typically further involve cooling the improved Q ceramic material at one or more suitable cooling conditions. For example, cooling can involve reducing the temperature of the improved Q ceramic material, or the environment thereof, to about room temperature of about 25° C., at a rate in a range of from about 100° C. per hour to about 300° C. per hour. Like the heating rate, the cooling rate can also advantageously be performed in separate stages or steps. Such embodiments of the invention may be appropriate to avoid or reduce the likelihood of fracturing or cracking of the improved Q ceramic component because of thermal shock due to a quick change in temperatures. For example, a preferred cooling rate, which can depend on considerations such as the geometrical configuration, the thermal conductivity, and the coefficient of thermal expansion of the material, can be performed at a rate of about 150° C. per hour. Sintering can thus provide a component that has a density, such as a target density, of at least about 95% of the theoretical density of the improved Q ceramic material.

The improved Q component may then be finished or machined to have desirable features or dimensions or to remove undesirable portions created during the formation process. For example, machining can involve creating one or more openings in the body of the component.

One or more further aspects of the present invention can be directed to repairing or modifying electronic devices, such as RF devices, to incorporate any one or more of the improved Q ceramic materials of the present invention. For example, the present invention can be directed to removing a ceramic resonator of an electronic devices and either retrofitting or installing a replacement resonator comprising an improved Q ceramic material having a formula, $$Ba_4M^{II}_{2-3x}Ln_{8+3x}Ti_{18-3x}M^{III}_{3x}O_{54},$$

whereby $x \leq 2/3$ and the material has an orthorhombic tungsten bronze crystal structure. In one implementation, $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some embodiments of the invention, the above composition is prepared in combination with $TiO_2$ (rutile) or a perovskite with the general formula $Nd_{1-1/3x}Ti_xO_3$ and $M^{III}$ is aluminum or gallium, or improved Q ceramic material having a formula, $$Ba_4(M^I_{0.5}Ln_{0.5})_{2-3x}Ln_{8+3x}Ti_{18-3x}M^{III}_{3x}O_{54},$$

whereby $x \leq 2/3$ and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium. In some other particular embodiments, the above composition is prepared in combination with $TiO_2$ (rutile) or a perovskite with the general formula $Nd_{1-1/3x}M^{III}_{1-x}Ti_xO_3$ and $M^{III}$ is aluminum or gallium.

In other embodiments, the replacement resonator is comprised of improved Q ceramic material having the formula, $$Ba_4M^{II}_{2-3x}Ln_{8+2x+y}Ti_{18-3x}M^{III}_{3y}O_{54},$$

where $0 < x < 2/3$ and $0 < y < 2/3$ and the material has an orthorhombic tungsten bronze crystal structure. $M^{II}$ is one of calcium or strontium, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium. In some other particular embodiments of the invention, the above composition is prepared in combination with $TiO_2$ (rutile) or a perovskite with the general formula $Nd_{1-1/3x}M^{III}_{1-x}Ti_xO_3$ and $M^{III}$ is aluminum or gallium, or improved Q ceramic material having the formula, $$Ba_4(M^I_{0.5+a}Ln_{5-a})_{2-3x}Ln_{8+2x+y}Ti_{18-3y+a}M^{III}_{3y-a}O_{54},$$

where $0 < x < 2/3$, $0 < y < 2/3$, and $-0.5 < a < 0.5$ and the material has an orthorhombic tungsten bronze crystal structure. $M^I$ is one of sodium, potassium, or copper, Ln is at least one element from the lanthanide series comprising yttrium, lanthanum, praseodymium, neodymium, samarium, gadolinium, dysprosium, holmium, thulium, erbium, ytterbium, or lutetium, and $M^{III}$ is one of aluminum or gallium. In some particular embodiments of the invention, Ln consists essentially of neodymium and $M^I$ consists essentially of sodium. In some other particular embodiments of the invention, the above composition is prepared in combination with $TiO_2$ (rutile) or a perovskite with the general formula $Nd_{1-1/3x}Ti_xO_3$ and $M^{III}$ is aluminum or gallium. The method can further comprise modifying the other components or subsystems of the apparatus to incorporate one or more properties of the ceramic improved Q material of the replacement resonator.

EXAMPLE 1

The present invention relates to an improved Q ceramic material and its physical characteristics. These characteristics are manipulated by adding or replacing elements within the crystal structure. The physical characteristics are listed in Tables 1-3.

Table 1 illustrates some of the changes in physical characteristics, such as Q, density, and $\tau_F$, resulting from a substitution sequence of elements such as zinc, manganese, gallium, etc.

TABLE 1

| Composition | Density | Dielectric Constant | $T_F$ | Q (3 GHz) |
|---|---|---|---|---|
| $Ba_4Sm_{10}Ti_{17}ZnO_{54}$ | 5.98 | 68.2 | | 1706 |
| $Ba_4Sm_{10}Ti_{17}MgO_{54}$ | 5.34 | 55.25 | | 6736 |
| $Ba_4Sm_{10}Ti_{17}NiO_{54}$ | 5.31 | 57.85 | | 783 |
| $Ba_4Sm_{10}Ti_{17}CoO_{54}$ | 5.64 | 63.37 | | 2861 |
| $Ba_4Sm_{10}Ti_{17}Al_2O_{54}$ | 5.55 | 53.81 | −64.86 | 16257 |
| $Ba_4Sm_{10}Ti_{17}Ga_2O_{54}$ | 5.80 | 59 | −78.05 | 10386 |
| $Ba_4Nd_{10}Ti_{17}Al_2O_{54}$ | 5.18 | 55.89 | +9.62 | 13253 |
| $Ba_4Nd_{10}Ti_{17}Ga_2O_{54}$ | 5.86 | 66.26 | −19.00 | 13402 |
| $Ba_4Nd_8Y_2Ti_{16}Al_2O_{54}$ | 5.65 | 63.09 | −34.99 | 7000 |
| $Ba_4Nd_8Sm_2Ti_{16}Al_2O_{54}$ | 5.11 | 52.08 | −5.21 | 12072 |

Table 2 illustrates the effect of adding yttrium, dysprosium, or holmium into a system such as $Ba_4Nd_{8.8}(Y, Dy, Ho)_{0.8}Ti_{17.2}Al_{0.8}O_{54}$.

TABLE 2

| Composition | Q | f (GHz) | Qf |
|---|---|---|---|
| Dy | 9567 | 1.0115 | 9576 |
| Y | 9724 | 1.0172 | 9891 |
| Ho | 9175 | 1.0237 | 9392 |
| 75% Dy - 25% Y | 9175 | 1.007 | 9239 |
| 75% Dy - 25% Ho | 9277 | 0.966 | 8961 |
| 50% Dy - 50% Y | 9470 | 0.996 | 9432 |
| 50% Dy - 25% Ho - 25% Y | 9415 | 1.000 | 9415 |
| 50% Dy - 50% Ho | 9210 | 1.003 | 9238 |
| 25% Dy - 75% Y | 9386 | 1.003 | 9414 |
| 25% Dy - 50% Y - 25% Ho | 9315 | 0.995 | 9268 |
| 75% Y - 25% Ho | 9377 | 1.001 | 9386 |
| 50% Y - 50% Ho | 9961 | 1.010 | 10060 |
| 25% Y - 75% Ho | 9352 | 1.007 | 9417 |

Table 3 illustrates the effect of the removal of vacancies, and therefore the tuning of $\tau_F$, of a BaSmTiAlO based crystal structure. In certain embodiments, partial removal of vacancies can be used to tune $\tau_F$.

TABLE 3

| Composition | Density | Dielectric Constant | TF | Q (3 GHz) |
|---|---|---|---|---|
| $Ba_4Sm_{9.6}Ti_{1.72}Al_{0.8}O_{54}$ | 5.62 | 66.33 | −50.38 | 11641 |
| $Ba_4Sm_{9.46667}Ti_{17.6}Al_{0.4}O_{54}$ | 5.69 | 79.5 | 48.17 | 16073 |
| $Ba_4Nd_{9.6}Ti_{17.2}Al_{0.8}O_{54}$ | 5.67 | 75.12 | 32.07 | 15298 |
| $Ba_4Nd_{9.7333}Ti_{16.8}Al_{1.8}O_{54}$ | 5.70 | 70.07 | 13.76 | 14635 |
| $Ba_4Nd_{9.8666}Ti_{16.4}Al_{1.6}O_{54}$ | 5.35 | 60.22 | 8.5 | 16028 |
| $Ba_4Nd_{9.0667}Y_{0.8}Ti_{17.2}Al_{0.4}O_{54}$ | 5.63 | 78.42 | 26.36 | 13936 |
| $Ba_4Nd_{8.8}Y_{0.8}Ti_{17.2}Al_{0.8}O_{54}$ | 5.57 | 72.3 | 5.85 | 14673 |
| $Ba_4Sm_{7.5733}Nd_{1.8933}Ti_{17.6}Al_{0.4}O_{54}$ | 5.77 | 80.27 | 20.23 | 15653 |
| $Ba_4Sm_{5.76}Nd_{3.84}Y_{0.8}Ti_{17.2}Al_{0.8}O_{54}$ | 5.81 | 74.65 | −7.26 | 16534 |

EXAMPLE 2

Changing the Shannon-Prewitt radii of ions in a crystal structure can affect a number of physical characteristics of a crystal. Tables 4 and 5 illustrate the effects of changing Shannon-Prewitt radii.

Table 4 lists the Shannon-Prewitt radii for the A, B, and C type sites in an orthorhombic tungsten bronze crystal structure, in accordance with certain embodiments of the present invention.

TABLE 4

| A-site | B-site | | C-site | | | |
|---|---|---|---|---|---|---|
| $Ba^{2+}$ = 1.75 | $Nd^{3+}$ = 1.249 | $Sm^{3+}$ = 1.219 | $Ti^{4+}$ = 0.749 | angstroms | | |
| $Na^{+}$ = 1.53 | $Li^{+}$ = 1.06 | $Na^{+}$ = 1.32 | $Lg^{2+}$ = 0.86 | $Ni^{2+}$ = 0.83 | | |
| $K^{+}$ = 1.78 | $Ca^{2+}$ = 1.20 | | $An^{2+}$ = 0.88 | $Co^{2+}$ = 0.885 | | |
| $Rb^{+}$ = 1.84 | $Sr^{3+}$ = 1.35 | | $Cu^{2+}$ = 0.87 | | | |
| $Ca^{2+}$ = 1.48 | $La^{3+}$ = 1.30 | | $Al^{3+}$ = 0.675 | $Sc^{3+}$ = 0.885 | | |
| $Sr^{2+}$ = 1.58 | $Ce^{3+}$ = 1.283 | | $Fe^{3+}$ = 0.60 | $In^{3+}$ = 0.94 | | |
| | $Pr^{3+}$ = 1.266 | | $Mn^{3+}$ = 0.72 | $Yb^{3+}$ = 1.008 | | |
| | $Nd^{3+}$ = 1.249 | | $Ga^{3+}$ = 0.74 | | | |
| | $Sm^{3+}$ = 1.219 | | $Cr^{3+}$ = 0.755 | | | |
| $La^{3+}$ = 1.50 | $Eu^{3+}$ = 1.206 | | $Ge^{4+}$ = 0.670 | $Hf^{4+}$ = 0.85 | $Si^{4+}$ = 0.54 | |
| $Ce^{3+}$ = 1.48 | $Gd^{3+}$ = 1.193 | | $Sn^{4+}$ = 0.83 | $Ce^{4+}$ = 1.01 | | |
| | $Dy^{3+}$ = 1.167 | | $Zr^{4+}$ = 0.86 | $Pr^{4+}$ = 0.99 | | |
| $Nd^{3+}$ = 1.41 | $Y^{3+}$ = 1.159 | | $V^{5+}$ = 0.68 | | | |
| $Sm^{3+}$ = 1.38 | $Ho^{3+}$ = 1.155 | | $Nb^{5+}$ = 0.78 | | | |
| | $Er^{3+}$ = 1.144 | | $Ta^{5+}$ = 0.78 | | | |
| | $Yb^{3+}$ = 1.125 | | $Mo^{6+}$ = 0.73 | | | |
| | | | $W^{6+}$ = 0.74 | | | |

Table 5 illustrates some of the physical characteristics, such as Q and density, caused by the substitution of different ions in $Ba_4Nd_{6.16}Sm_{3.4}Ti_{17.32}Al_{0.68}O_{54}$.

TABLE 5

| Composition | Avg. Ionic Radius | Density | Dielectric Constant | Qf (3 GHz) | Qf (1 Ghz) |
|---|---|---|---|---|---|
| $Ba_4Nd_{6.16}Sm_{3.4}Ti_{17.32}Al_{0.68}O_{54}$ | .675 | 5.78 | 75.26 | 14908 | 10500 |
| $Ba_4Nd_{6.16}Sm_{3.4}Ti_{17.32}Ga_{0.68}O_{54}$ | .74 | 5.71 | 73.91 | 13602 | 8981 |
| $Ba_4Nd_{6.16}Sm_{3.4}Ti_{17.32}Al_{0.34}Ga_{0.34}O_{54}$ | .7075 | 5.75 | 74.64 | 13704 | 9392 |
| $Ba_4Nd_{6.16}Sm_{3.4}Ti_{17.32}Fe_{0.68}O_{54}$ | .69 | | | | 4610 |
| $Ba_4Nd_{6.16}Sm_{3.4}Ti_{17.32}Mn_{0.68}O_{54}$ | .72 | | | | 8045 |
| $Ba_4Nd_{6.16}Sm_{3.4}Ti_{17.32}Cr_{0.68}O_{54}$ | .755 | 5.77 | 75.04 | 1189 | 5785 |
| $Ba_4Nd_{6.16}Sm_{3.4}Ti_{17.32}Sc_{0.68}O_{54}$ | .885 | 5.65 | 71.36 | 9241 | 5827 |
| $Ba_4Nd_{6.16}Sm_{3.4}Ti_{17.32}In_{0.68}O_{54}$ | .94 | 5.77 | 72.57 | 4822 | 3167 |
| $Ba_4Nd_{6.16}Sm_{3.4}Ti_{17.32}Yb_{0.68}O_{54}$ | 1.008 | 5.65 | 68.06 | 8185 | 3876 |
| $Ba_4Nd_{6.16}Sm_{3.4}Ti_{17.32}Zn_{0.34}Ti_{0.34}O_{54}$ | .8145 | 5.77 | 78.81 | 6983 | 6395 |
| $Ba_4Nd_{6.16}Sm_{3.4}Ti_{17.32}Mg_{0.34}Ti_{0.34}O_{54}$ | .8045 | 5.71 | 77.84 | 9565 | 8101 |

EXAMPLE 3

One or more further aspects of the invention involves dielectric compositions having a primary phase comprising the modified improved Q ceramic materials, and one or more additional phases comprising a material that modifies one or more physical properties of the primary improved Q ceramic material. For example, the present invention of improved Q material ceramic material can be prepared in combination with compositions such as $TiO_2$ (rutile). Table 6 lists the physical characteristics of the present invention combined with 20% $TiO_2$.

TABLE 6

| Composition | X | ε' | Qf (3 GHz) |
|---|---|---|---|
| 80% $Ba_{5.25}Nd_{8.75}Ti_{17.25}Al_{0.75}O_{54}$ 20% $TiO_2$ | .25 | 75.6 | 15704 |
| 80% $Ba_{5.10}Nd_{8.90}Ti_{17.1}Al_{0.9}O_{54}$ 20% $TiO_2$ | .30 | 60.01 | 7371 |
| 80% $Ba_{4.95}Nd_{9.05}Ti_{16.95}Al_{1.05}O_{54}$ 20% $TiO_2$ | .35 | 62.17 | 7130 |
| 80% $Ba_{4.8}Nd_{9.2}Ti_{16.8}Al_{1.2}O_{54}$ 20% $TiO_2$ | .40 | 62.02 | 5858 |
| 80% $Ba_{4.65}Nd_{9.35}Ti_{16.65}Al_{1.35}O_{54}$ 20% $TiO_2$ | .45 | 66.7 | 10946 |
| 80% $Ba_{4.5}Nd_{9.5}Ti_{16.5}Al_{1.5}O_{54}$ 20% $TiO_2$ | .50 | 79.05 | 15963 |
| 80% $Ba_{4.35}Nd_{9.65}Ti_{16.35}Al_{1.65}O_{54}$ 20% $TiO_2$ | .55 | 77.47 | 15663 |

TABLE 6-continued

| Composition | X | ε' | Qf (3 GHz) |
|---|---|---|---|
| 80% $Ba_{4.2}Nd_{9.8}Ti_{16.2}Al_{1.8}O_{54}$ 20% $TiO_2$ | .60 | 73.55 | 15123 |
| 80% $Ba_{4.05}Nd_{9.95}Ti_{16.05}Al_{1.95}O_{54}$ 20% $TiO_2$ | .65 | 71.13 | 14209 |
| 80% $Ba_{3.9}Nd_{10.10}Ti_{15.9}Al_{2.1}O_{54}$ 20% $TiO_2$ | .70 | 67.65 | 8961 |
| 80% $Ba_{3.75}Nd_{10.25}Ti_{15.75}Al_{2.25}O_{54}$ 20% $TiO_2$ | .75 | 63.69 | 11998 |

Application of the Material

One or more embodiments of the present invention provide a framework to develop real world devices in the field of electronics, including, but not limited to, radio frequency. Electronic components used in radio frequency preferably have improved Q, a high dielectric constant, and a temperature coefficient of resonant frequency near 0. Embodiments of the present invention provide for a ceramic material having such desirable qualities.

Figure 12:
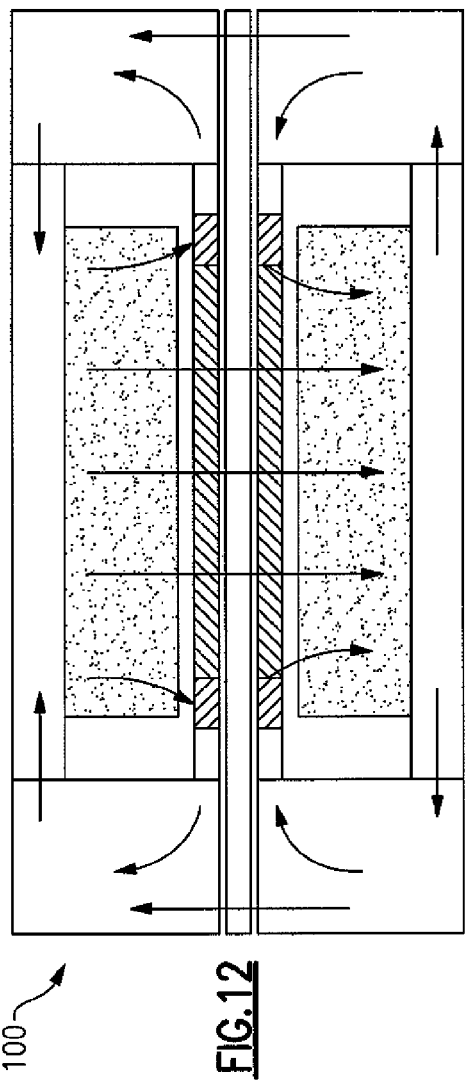
FIG. 12 illustrates a circulator which can be configured to function as a resonator and utilize certain preferred embodiments.
Figure 13:
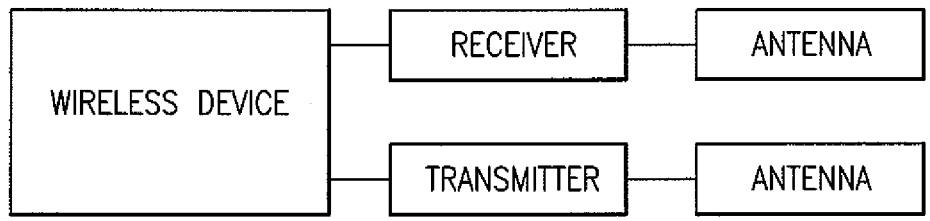
FIG. 13 illustrates a schematic of an antenna system in which certain preferred embodiments are used.
Figure 14:
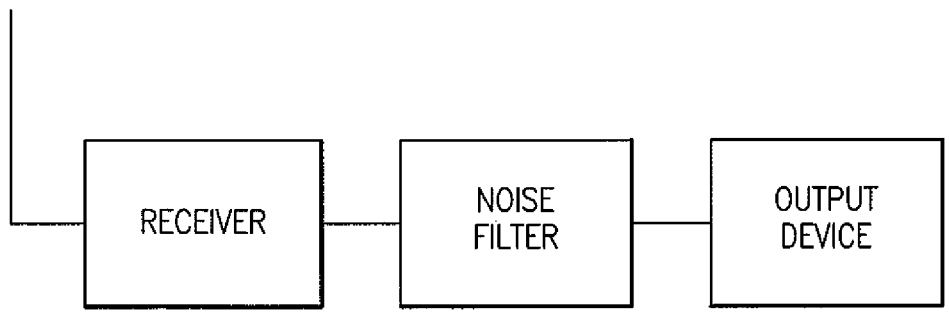
FIG. 14 illustrates a schematic of a filtering system in which certain preferred embodiments are used.

Materials formed in accordance with preferred embodiments of the present invention have applications in electronic devices, such as ceramic antennas and resonators. FIG. 12 illustrates a resonator 100 that the improved Q material according to preferred embodiments of the present invention can be used to create. FIG. 13 diagrams an antenna system 200 in which the material can also be used to create the antenna 202 and other components. Certain embodiments of the present invention are especially useful in helical antennas. Certain embodiments of the present invention can be used in the formation of noise filtration system 300 shown in FIG. 14 filters for cellular communicators, such as, but not limited to, TE and TM mode filters. Embodiments of the present invention can also be used in components of advanced 3 G and 4 G filtering for wireless data streaming, as well as in components supporting LTE platforms. The present invention may also considerably expand the number of improved Q ceramic dielectric materials available for cellular phones, biomedical devices, and RFID sensors. One skilled in the art would understand that using embodiments of the present invention in modifying devices in other fields, such as electronics or microwaves, would provide useful physical characteristics in those fields.

Provided herein are various non-limiting examples of compositions, materials, and methods of preparing the materials for electronic applications. While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all the features and benefits as set forth herein, as some features may be used or practiced separate from others.

What is claimed is:

1. A method of modifying the Q of a ceramic material having an orthorhombic tungsten bronze structure, said method comprising substituting one or more Al atoms with one or more ions, the substituted ceramic material having a primary phase and one of additional phases comprising a perovskite.

2. The method of claim 1 wherein said one or more ions is selected from the group consisting of Ga, Al, Mg and Zn.

3. A method of increasing the Q of a ceramic material having an orthorhombic tungsten bronze structure, said method comprising substituting one or more $Be^+$ for $Nd^{3+}$ and $Sm^{3+}$, the ceramic material having a primary phase and one of additional phases comprising a perovskite.

4. The method of claim 1 wherein said perovskite is represented by the general formula $Nd_{1-1/3x}M^{III}_{1-x}Ti_xO_3$ $M^{III}$ being selected from the group consisting of aluminum, gallium, and combinations thereof.

5. The method of claim 1 wherein the ceramic material has a dielectric constant between 60-100.

6. The method of claim 1 wherein the ceramic material has a Q greater than 6000 at 1 GHz.

7. The method of claim 1 wherein the ceramic material prior to substitution has a composition represented by the formula $Ba_{6-3}Nd_{8+2x}Ti_{18}O_{54}$, x being less than or equal to $2/3$.

8. The method of claim 1 further comprising incorporating the ceramic material into an electronic device.

9. The method of claim 1 wherein the ceramic material is selected from the group consisting of $Ba_4Ln_8Ln'_2Ti_{16}Al_2O_{54}$, and $Ba_2K_2Ln_8Ln'_2Ti_{18}O_{54}$, Ln is selected from the group consisting of praseodymium, neodymium, samarium, and gadolinium and Ln' is selected from the group consisting of lanthanum, praseodymium, neodymium, samarium, gadolinium, holmium, yttrium, erbium, ytterbium, and indium.

10. The method of claim 1 wherein the ceramic material is selected from the group consisting of $Ba_4Nd_8Sm_2Ti_{16}Al_2O_{54}$, $Ba_4Nd_8Y_2Ti_{16}Al_2O_{54}$, and $Ba_4Nd_8Ho_2Ti_{16}Al_2O_{54}$.

11. The method of claim 3 wherein said perovskite is represented by the general formula $Nd_{1-1/3x}M^{III}_{1-x}Ti_xO_3$ $M^{III}$ being selected from the group consisting of aluminum, gallium, and combinations thereof.

12. The method of claim 3 wherein the ceramic material has a dielectric constant between 60-100.

13. The method of claim 3 wherein the ceramic material has a Q greater than 6000 at 1 GHz.

14. The method of claim 3 further comprising incorporating the ceramic material into an electronic device.

15. The method of claim 7 wherein Ba ions greater than 4 formula units are substituted for $Sr^{2+}$, $Ca^{2+}$, or a combination of $Na^+$ and $Nd^{3+}$.

16. A method of modifying the Q of a ceramic material comprising $Ba_4Nd_{6.16}Sm_{3.4}Ti_{17.32}Al_{0.68}O_{54}$, said method comprising substituting out titanium ions and replacing them with germanium ions.

17. The method of claim 16 wherein $Ti_{0.1}$ is substituted out for $Ge_{0.1}$.

18. The method of claim 16 wherein the Q is increased to about 12397 at 1.14 GHz.

19. The method of claim 16 further comprising incorporating the ceramic material into an electronic device.

* * * * *